United States Patent [19]
Mushovic et al.

[11] 3,881,593
[45] May 6, 1975

[54] CHAIN CONVEYOR LINK AND ATTACHMENT THEREFOR

[75] Inventors: John N. Mushovic, Simsbury; Richard M. Bell, Lakeville, both of Conn.

[73] Assignee: Norton Company, Worcester, Mass.

[22] Filed: Jan. 28, 1974

[21] Appl. No.: 437,328

[52] U.S. Cl. .............................. 198/189; 198/195
[51] Int. Cl. .................................... B65g 17/06
[58] Field of Search ...... 198/189, 194, 195; 74/254, 74/251

[56] References Cited
UNITED STATES PATENTS

| | | | |
|---|---|---|---|
| 1,136,578 | 4/1915 | Ayres | 305/13 |
| 2,810,297 | 10/1957 | Drewrys | 74/254 |
| 2,954,113 | 9/1960 | Hibbard et al. | 198/189 |
| 3,262,550 | 7/1966 | Kampfer | 198/189 |
| 3,312,117 | 4/1967 | Gritt | 198/189 |

Primary Examiner—Evon C. Blunk
Assistant Examiner—Jeffrey V. Nase
Attorney, Agent, or Firm—Lewis M. Smith, Jr.

[57] ABSTRACT

A conveyor chain link and an attachment therefor arranged to be readily engaged with, fixedly secured to, and readily removed from the associated link, the chain link including upstanding attachment engaging means formed integrally therewith and including external attachment supporting surfaces and adjoining external attachment constraining surfaces, and the attachment having a recess therein defined by internal attachment supporting surfaces and adjoining internal attachment constraining surfaces arranged to be closely interfitted with the respective attachment supporting surfaces and attachment constraining surfaces of the attachment engaging means on the chain link.

12 Claims, 5 Drawing Figures

CHAIN CONVEYOR LINK AND ATTACHMENT THEREFOR

BACKGROUND OF THE INVENTION

1. Field of the Invention

This invention relates to a conveyor chain link arranged to support and fully constrain an attachment removably connected thereto, and particularly to a conveyor chain link with an integral attachment engaging means having supporting and constraining surfaces slidable into closely interfitted juxtaposition with complementary supporting and constraining surfaces within a recess in the attachment, in order to facilitate original installation of the attachment and its subsequent removal and replacement as necessary.

2. Description of the Prior Art

U.S. Pat. No. 1,136,578, granted Apr. 20, 1915 to W. S. Ayres, discloses a conveyor in which each of a series of elongated pivotally interconnected chain links includes an integral plate-like portion to which a transversely elongated flat strip is permanently attached by a rivet. Ayres also contemplates an arrangement in which each of a series of transversely elongated flat strips is riveted to each of several chain links respectively incorporated in transversely spaced conveyor belts. With this arrangement, replacement of a worn or damaged strip requires disassembly of the conveyor chain or chains and the substitution therefor of a new link or links supporting a new strip riveted thereto Similarly, the substitution of a different size of strip or a different type of attachment requires disassembly of the conveyor chain or chains for this purpose.

U.S. Pat. No. 2,911,091, granted Nov. 3, 1959 to P. J. Imse, describes a flat top conveyor comprising a series of unitary flat-top conveyor links each formed of molded plastic material. Here again, the table portion corresponding to the attachment is permanently attached to the cooperating chain link, in this case by being formed integrally therewith. Here again, replacement of a worn or broken table portion would require disassembly of the conveyor chain and substitution of a replacement link and table portion, as would the substitution in a given conveyor installation of different sized table portions or a different type of attachment.

U.S. Pat. No. 2,954,113, granted Sept. 27, 1960 to N. R. Hibbard et al, discloses flat-top conveyor chain attachments comprising molded plastic table top units with dependent flexible legs formed integrally therewith and shaped to engage and to be constrained by cooperating surfaces of the links of a supporting roller chain. Such attachments can be connected to and removed from the chain without disassembling the chain. However, since the surfaces on the dependent legs shaped to engage cooperating surfaces of the chain link are spaced a substantial distance from the body of the attachment and since the dependent legs on which they are formed are necessarily flexible to permit engagement and disengagement of the dependent legs with the chain link, it may be difficult to fully immobilize the attachment relative to the cooperating chain link by such connecting means. Moreover, since the attachment can only be released from the chain link by the application of means effective to suitably displace the free ends of the dependent legs, the means supporting and enclosing the conveyor chain must be arranged so that these ends of the dependent legs are accessible for this purpose.

SUMMARY OF THE INVENTION

The present invention contemplates an elongated conveyor chain link including attachment engaging means thereon and comprising one of a series of such links each interconnected at its opposite extremities pivotally to adjacent such links to form a continuous chain conveyor belt, and a conveyor link attachment arranged to be displaced longitudinally relative to the elongated chain link into and out of fixed engagement with the attachment engaging means of the belt link and comprising one of a corresponding series of such attachments collectively effective to support and transfer a series of articles by means of the chain conveyor chain. Each said conveyor link may be formed from an appropriate relatively light and relatively strong self-lubricating plastic material, and each said attachment may be formed from an appropriate smoothly finished corrosion resistant molded plastic material, both able to be cleaned and sterilized easily as often as required for the use to which the chain conveyor chain is put.

DETAILED DESCRIPTION OF THE INVENTION

Figure 1:
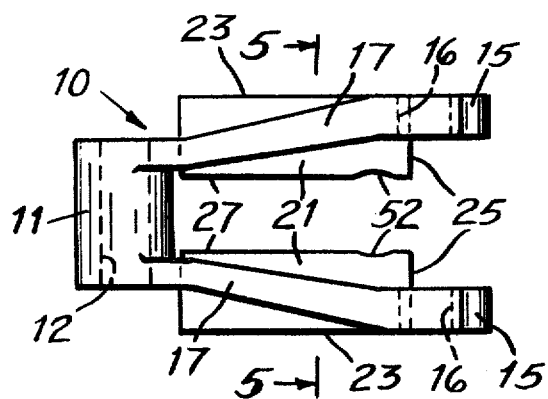
FIG. 1 is a bottom plan view of the preferred embodiment of the belt link.
Figure 3:
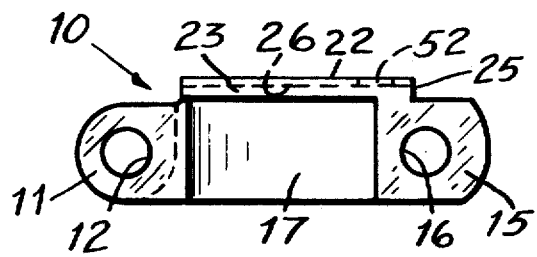
FIG. 3 is a side elevation of the chain link shown in FIG. 1.

Referring first to FIGS. 1 and 3 of the drawings, the elongated chain link, generally designated by the reference numeral 10, includes a single projection 11 at one end thereof with a transverse aperture 12 therethrough and a pair of projections 15 at the other end thereof with transverse apertures 16 therethrough and spaced apart sufficiently to receive projection 11 therebetween, so that adjoining chain links may be interconnected by inserting an elongated pivot pin through the apertures 16 in the projections 15 of one chain link and through the aperture 12 in the projection 11 of an adjoining chain link. Each pivot pin may be secured by a press fit in one of both of the apertures 16 while it is freely rotatable in the aperture 12.

This invention is concerned particularly with the external configuration of the attachment engaging means of the link 10 and with the complementary internal configuration of the recess in attachment 30. Since the external configuration of the attachment engaging means is composed of various exterior surface areas and surfaces, they are referred to hereinafter as outer surface areas and surfaces. Conversely, since the internal configuration of the recess is determined by interior surface areas and surfaces, they are referred to hereinafter as inner surface areas and surfaces, as distinguished from the compelementary outer surface areas and surfaces of the attachment engaging means.

Elongated link body members 17 respectively interconnect the projection 11 and the respective projections 15. The respective link body members 17 also support the respective portions 21 of the attachment engaging means formed integrally with the chain link and including an outer attachment supporting surface area 22, parallel outer attachment constraining side surfaces 23, a transversely extending outer attachment constraining surface 25, an opposing under surface 26, and parallel side surfaces 27 together defining a slot extending lengthwise of the chain link and separating the respective portions 21 of the attachment engaging means.

Figure 2:
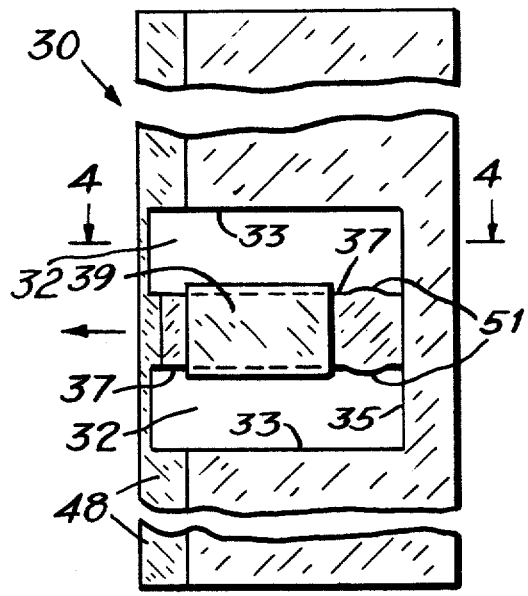
FIG. 2 is a bottom plan view, partially broken away, of the preferred embodiment of the chain link attachment.
Figure 4:
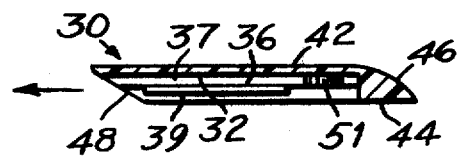
FIG. 4 is a transverse section of the chain link attachment taken on line 4—4 of FIG. 2.
Figure 5:
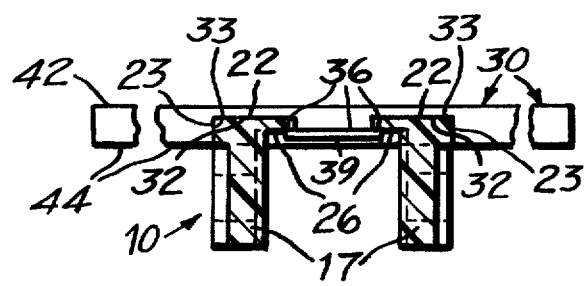
FIG. 5 is a transverse section of the chain link taken on line 5—5 of FIG. 1, also showing the chain link attachment in operative engagement with the belt link, shown upright in this view.

Referring to FIGS. 2, 4 and 5, the chain link attachment illustrated comprises a transversely elongated table top portion, generally designated by the reference numeral 30, a series of which co-act to form a flat-top conveyor the width of which is determined by the selected transverse length of the attachments 30. The table top portion illustrated includes a flat upper surface 42, a flat lower surface 44, an arcuately curved leading edge 46, and a chamfered trailing edge 48.

For longitudinal sliding engagement with the attachment engaging means on the elongated chain link body, the lower and rear surfaces of the table top portion 30 are interrupted by a recess defined by an inner attachment supporting surface area 32, parallel inner attachment constraining side surfaces 33, and a transversely extending inner attachment constraining surface 35 respectively movable into juxtaposition with outer attachment supporting surface area 22, outer attachment constraining side surfaces 23, and transversely extending outer attachment constraining surface 25 as the attachment is moved slidably into full engagement with the chain link.

The attachment 30 also includes a connecting means to maintain the outer attachment supporting surface area 22 of the chain link 10 in sliding engagement with the inner attachment supporting surface area of attachment 30 as the attachment 30 is moved longitudinally of and slidably into full engagement with the chain link 10. This connecting means constitutes a key member interrupting and projecting from the inner attachment supporting surface area 32 and including a relatively narrower cross section with side surfaces 37 in juxtaposition with side surfaces 27 of the slot through the attachment engaging means on the chain link and a relatively wider cross section 39 with interior surfaces 36 in juxtoposition with the under surface 26 of the portions 21 of the attachment engaging means on the chain link.

The attachment 30 also incorporates retaining means effective to maintain the attachment fully engaged with the chain link until the attachment is deliberately forcibly disengaged from the chain link. The retaining means comprises arcuately curved or faired projections 51 from the side surfaces 37 shaped and located to be seated in depressions 52 in the side surfaces 27, and thereby functioning as attachment detents, when the transversely extending surface 35 is in juxtaposition with the transversely extending surface 25 as the attachment 30 is fully engaged with the chain link 10.

Since the juxtaposed surfaces and surface areas of portions 21 of the attachment engaging means and the recess in the attachment 30 are preferably fitted as closely together as possible consistent with relative sliding movement of the attachment 30 and the line 10, the respective projections 51 and depressions 52 may in fact be relatively much smaller than they are shown for clarity in the drawings. In other words, if the material from which the link and the attachment are made is rigid enough to preclude substantial local deformation of the material, the clearance between the respective side surfaces 23 and 33 must be sufficient to accommodate the amount of lateral deflection of the portions 21 of the attachment engaging means adequate to permit the passage of the projections 51 along the side surfaces 27 into the depressions 52 therein.

The stresses expected to be imposed upon the chain link and the attachment and the strength of the material from which each of these components is to be made should be carefully considered in determining the critical dimensions of the chain link and the attachment. For example, the transverse surface 35 and the table top attachment 30 shown in FIGS. 2 and 4 should be of such a size and so located that the table top is fully capable of withstanding the load imposed upon it by an article supported thereby tending to maintain the table top in full engagement with the attachment engaging means on the chain link 10.

Similarly, the relatively wide portion 39 of the key member must be strong enough to support the entire weight of the table top 30 as the chain conveyor is passed over supporting and driving sprockets therefor and along a lower course in which the table top is dependent from the attachment engaging means on the chain link.

Finally, the interaction between the projection 51 and the depression 52 of the retaining means need only be strong enough to withstand any tendency to displace the table top 30 slidably from the chain link 10 under normal operating conditions.

In the showing of the preferred embodiment of the instant invention in the drawings, the respective attachment supporting surface areas are shown as planar, although they may alternatively be arcuately curved or include angularly offset portions each consistent with the sliding relative movement of these surface areas. Similarly, the end and side surfaces are shown as planar and perpindicular to the adjoining surface areas, and the respective side surfaces are shown as parallel. Alternatively, these surfaces may be disposed at other angles relative to the adjoining surface area and be otherwise contoured consistent with the requirement for sliding movement into juxtoposition. For example, the parllel side surfaces may be replaced with oppositely arcuately curved or otherwise convergent side surfaces.

When the interfitting components are made of molded plastic material, the configuration of the respective surface areas and adjoining surfaces may be further limited by the requirements necessarily met to conform to practical molding procedures.

Noting that it may be relatively difficult and time-consuming to disassemble the links comprising a chain conveyor, and that the upper surface of a horizontally disposed chain conveyor chain belt is most readily accessible when such a belt is installed on supporting sprockets, the present invention provides a convenient arrangement for selectively engaging and disengaging an attachment and a cooperating elongated chain link by moving the attachment longitudinally along the upper surface of a chain link connected in a chain conveyor belt.

In addition, the direction in which the attachment is moved longitudinally of and into full engagement with the belt link is such that it is continuously biased toward full engagement with the belt link under the load imposed on the attachment by an article supported thereby.

Finally, the retaining means automatically operative to secure the attachment in full engagement with the chain link is also automatically disengaged whenever the attachment is forcibly moved longitudinally of the chain link out of full engagement therewith, again without disassembling the chain conveyor.

With the present invention, whenever it is necessary to convert a given flat-top conveyor system from one width to another, attachments comprising table top portions of one transverse length may all be removed from cooperating chain links and be replaced with table top portions of another transverse length, all without disassembling the chain conveyor on which the respective table top portions are supported.

The working section of a flat-top conveyor chain is usually supported so that the upper surfaces of a series of attachments comprising table top portions are coplanar, with the respective leading and trailing edges of the table top portions overlapping each other, apparently precluding significant longitudinal movement of each attachment relative to its supporting chain link without disassembly of the chain conveyor. This apparent limitation is obviated by positioning each chain link upon the circumference of a chain conveyor supporting sprocket, with adjacent chain links angularly offset, so that one attachment can be removed from and another attachment can be mounted upon each chain link by the requisite movement longitudinally of the link without interference with the adjacent attachment or chain link and without disassembly of the conveyor belt.

The representative attachment 30 shown in the drawings comprises a rectangular table top portion useful on a straight conveyor. Alternatively, the table top portion may be tapered toward one or both ends thereof to accommodate lateral curvature of the conveyor path as shown in U.S. Pat. No. 3,262,550, granted July 26, 1966, to R. H. Kampfer.

Other attachment configurations may be engaged with or disengaged from a cooperating belt link with the same facility. For example, the attachment shown in FIG. 2 may be shaped to provide additional constraint for an article supported thereby as shown in U.S. Pat. No. 1,740,607, granted Dec. 24, 1929, to J. W. Leary.

Some or all of the attachments on a conveyor belt may include, either instead of or in addition to a table top portion, one or more upstanding elements such as a pusher, an indexing finger, or a slicing device, for example.

Although a conveyor belt is frequently arranged with its working section disposed horizontally, attachments mounted upon supporting belt links in the manner contemplated herein may be used with conveyor belts having working sections disposed vertically or at other angles to the horizontal. For example, such attachments may be shaped to form suitably oriented hoppers or elevator platforms.

The written description herein and the showing in the accompanying drawings are intended to be illustrative of the instant invention rather than limiting in any sense, and the scope of the instant invention is to be limited only by the scope of the claims appended hereto.

What is claimed is:

1. A conveyor link arranged to be interconnected pivotally to adjoining links at opposite ends thereof,
   attachment engaging means fixedly secured to said link provided with an outer attachment supporting surface area and adjacent outer attachment constraining surfaces,
   an attachment supported upon and fully engaged with said link,
   a recess in the attachment defined by an inner attachment supporting surface area and adjacent inner attachment constraining surfaces, said outer and inner attachment supporting surface areas and said outer and inner attachment constraining surfaces respectively being disposed in juxtaposition,
   connecting means for maintaining the outer and inner attachment supporting surface areas in sliding juxtaposition whenever said attachment is moved slidably into and out of engagement with said link,
   and retaining means operative when said attachment is fully engaged with said link to restrain said attachment against sliding movement out of engagement with said link.

2. A device as described in claim 1, wherein said connecting means comprises
   a slot through said attachment engaging means interrupting the outer attachment supporting surface area and defined by elongated opposed side surfaces, and
   an elongated sliding key member interrupting and projecting beyond the inner attachment supporting surface area and including a relatively narrow cross section with side surfaces respectively in juxtaposition with the side surfaces of the slot through said attachment engaging means and a relatively wide cross section with surfaces engaging elongated surfaces on the side of said attachment engaging means remote from and opposed to the outer attachment supporting surface area thereof.

3. A device as described in claim 2, wherein said retaining means comprises
   a faired projection and a cooperating depression respectively formed on and in each of at least one juxtaposed pair of side surfaces of said key member and said slot through said attachment engaging means,
   each faired projection and each cooperating depression on juxtaposed side surfaces being so located lengthwise thereof that each faired projection is engaged in its cooperating depression automatically when said attachment is fully engaged with said link, and
   each faired projection being disengaged from its cooperating depression automatically whenever said attachment is forcibly slidably disengaged from said link.

4. A chain conveyor link arranged to be interconnected pivotally with adjoining chain links at opposite ends thereof, including
   an elongated link body with a single transversely apertured projection at one end thereof and a pair of transversely apertured projections at the other end thereof spaced to receive the single projection therebetween,
   whereby said elongated link body may be connected pivotally at each end thereof to the complementary projections from adjacent link bodies by means of pivot pins through the respective transversely apertured projections, an attachment engaging means with a predetermined external surface configuration on said chain link, an attachment for said chain link comprising a transversely elongated table portion with generally parallel working and reverse surfaces and a recess in the reverse surface having an internal surface configuration matching the external surface configuration of said attachment engaging means, connecting means within the recess in said attachment having elongated reentrant surfaces engaged by elongated opposing surfaces on said attachment engaging means effective to maintain the external surface configuration of said attachment engaging means in sliding engagement with the internal surface configuration of the recess in said attachment, and complementary external and internal surface portions on said attachment engaging means and on said attachment effective in mutual engagement to limit relative sliding movement when the attachment is fully engaged with the attachment engagement means on the chain link.

5. A device as described in claim 4, including in addition retaining means consisting of coacting detent elements respectively incorporated in said attachment engaging means and in said attachment, automatically operatively engaged to restrain said attachment against sliding movement relative to said attachment engaging means when said attachment is fully seated on said attachment engaging means and automatically disengaged when said attachment is forcibly displaced slidably relative to said attachment engaging means.

6. In a substantially horizontally disposed portion of a flat-top chain conveyor assembly, a horizontally disposed elongated link with a single transversely apertured projection at one end thereof and a pair of transversely apertured projections at the other end thereof spaced to receive the single projection therebetween, whereby said elongated link may be connected pivotally at each end thereof to the complementary projections from adjacent links by means of pivot pins through the respective transversely apertured projections, first and second elongated link body members respectively interconnecting one of said spaced projections at one end of said link and the single projection at the other end of said link, first and second portions of an attachment engagement means respectively formed integrally with the upper edges of the first and second link body members, said first and second portions of said attachment engaging means together providing a relatively larger upwardly facing outer attachment supporting surface area, a relatively smaller downwardly facing surface area, outer attachment constraining parallel side surfaces at opposite sides thereof, an outer attachment constraining transverse end surface at one end thereof, and a longitudinally extending slot separating said first and said second portions of said attachment engaging means and defined by opposed side surfaces thereof, an attachment comprising a table top portion with substantially parallel upper and lower surfaces, a recess therein disposed centrally of its lower surface having first and second laterally spaced portions of an attachment supporting surface area, inner attachment constraining parallel side surfaces, and an inner attachment constraining transverse end surface, connecting means arranged to establish and maintain a sliding relationship between the outer and inner attachment supporting surface areas of said link and said table top portion, comprising an elongated key member projecting outwardly from and extending lengthwise between the first and second portions of the inner attachment supporting surface area of said table top portion having a relatively narrower neck portion with side surfaces facing the side surfaces of the slot through said attachment engaging means, and a relatively wider portion with upwardly facing surfaces in juxtaposition with the downwardly facing surface area of said attachment engaging means, whereby the respective outer and inner attachment supporting surface areas and the respective outer and inner attachment constraining end and side surfaces of the attachment engaging means and the recess in the table top portion are moved into juxtaposition, and attachment retaining means including arcuately curved projections from the respective side surfaces of said key member, and cooperating depressions in the respective side surfaces of the slot through said attachment engaging means, whereby the arcuately curved projections are slidable along the respective side surfaces of the slot through the attachment engaging means into engagement with the cooperating depressions when the respective outer and inner attachment constraining transverse end surfaces are juxtaposed, and self-actuated by their arcuate surfaces to disengage from the cooperating depressions when the table is moved slidably out of engagement with the attachment engaging means.

7. An elongated conveyor link arranged to be interconnected pivotally to adjoining links at opposite ends thereof, attachment engaging means fixedly secured to said elongated link provided with a longitudinally extending outer attachment supporting surface area and adjacent longitudinally extending outer attachment constraining surfaces, an attachment provided with a recess therein including a longitudinally extending inner attachment supporting surface area and adjacent longitudinally extending inner attachment constraining surfaces shaped and arranged to be maintained in sliding juxtaposition with said longitudinally extending outer attachment supporting surface area and said longitudinally extending outer attachment constraining surfaces, respectively, connecting means for maintaining said longitudinally extending outer and inner attachment supporting surface areas and said longitudinally extending outer and inner attachment constraining surfaces in sliding juxtaposition whenever said attachment is slidably displaced longitudinally of said elongated link into and out of full engagement with said attachment engaging means fixedly secured to said elongated link, and stop means comprising a transversely extending outer attachment constraining surface on said attachment engaging means and a complementary transversely extending inner attachment constraining surface included in the recess in said attachment arranged to be in mutual engagement whenever said attachment is fully engaged with said attachment engaging means.

8. A device as described in claim 7, and in addition, attachment retaining means operative when said attachment is fully engaged with said elongated link to restrain said attachment against sliding movement longitudinally of said elongated link out of engagement with said attachment engaging means.

9. A conveyor link arranged to be interconnected pivotally to adjoining links at opposite ends thereof, attachment engaging means fixedly secured to said link provided with an outer attachment supporting surface area and adjacent outer attachment constraining surfaces, an attachment supported upon and fully engaged with the attachment engaging means on said link, a recess in the attachment including an inner attachment supporting surface area and adjacent inner attachment constraining surfaces, said outer and inner attachment supporting surface areas and said outer and inner attachment constraining surfaces respectively being disposed in juxtaposition, and connecting means for maintaining the outer and inner attachment supporting surface areas in sliding juxtaposition whenever said attachment is moved slidably into and out engagement with the attachment engaging means on said link.

10. A device as described in claim 9, and in addition, retaining means operative when said attachment is fully engaged with the attachment engaging means on said link to restrain said attachment against sliding movement out of engagement with said attachment engaging means on said link.

11. An array of conveyor links arranged to be interconnected pivotally each to the adjoining links at opposite ends thereof, and collectively arranged to move in a given direction, attachment engaging means fixedly secured to at least some said conveyor links attachment means slidable into engagement with said attachment engaging means in the direction opposite to said given direction, and stop means operative to limit movement of said attachment means relative to said attachment engaging means.

12. Apparatus as described in claim 11, and, in addition retaining means operative to maintain said attachment means in engagement with said attachment engaging means.

* * * * *